US012782623B2

(12) United States Patent
Bourreau et al.

(10) Patent No.: US 12,782,623 B2
(45) Date of Patent: Nov. 3, 2026

(54) MULTI-BANDPASS OPTICAL INTERFERENCE FILTER

(71) Applicant: VIAVI Solutions Inc., Chandler, AZ (US)

(72) Inventors: Christophe Bourreau, Paris (FR); Markus Bilger, Santa Rosa, CA (US); Georg J. Ockenfuss, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 722 days.

(21) Appl. No.: 17/809,331

(22) Filed: Jun. 28, 2022

(65) Prior Publication Data

US 2023/0012033 A1 Jan. 12, 2023

Related U.S. Application Data

(60) Provisional application No. 63/219,142, filed on Jul. 7, 2021.

(51) Int. Cl.

*G02B 5/28* (2006.01)
*G01J 3/28* (2006.01)
*G02B 5/20* (2006.01)

(52) U.S. Cl.

CPC ............ *G02B 5/282* (2013.01); *G01J 3/2803* (2013.01); *G02B 5/208* (2013.01)

(58) Field of Classification Search

CPC . G02B 5/20; G02B 5/208; G02B 5/28; G02B 5/281; G02B 5/282; G01J 3/2803

See application file for complete search history.

(56) References Cited

U.S. PATENT DOCUMENTS

| | | | |
|---|---|---|---|
| 5,173,808 A | 12/1992 | Auer et al. | |
| 9,372,118 B1 | 6/2016 | Taplin et al. | |

(Continued)

FOREIGN PATENT DOCUMENTS

| | | | |
|---|---|---|---|
| CN | 108388026 A | 8/2018 | |
| CN | 110045450 A | 7/2019 | |

OTHER PUBLICATIONS

Omega Optical, "Optical Interference Filters" catalog, available at least as of 2012, accessed online on Feb. 28, 2025, pp. 1-3 and 77, https://www.spotimaging.com/downloads/public/pdf/omega_optical_filters.pdf (Year: 2012).*

(Continued)

*Primary Examiner* — Stephone B Allen
*Assistant Examiner* — Adam W Booher
(74) *Attorney, Agent, or Firm* — Foley & Lardner LLP

(57) ABSTRACT

An optical device includes an optical sensor, a dye-based optical filter, and a multi-bandpass optical interference filter. The multi-bandpass optical interference filter is configured to pass a first spectral range of visible light, a second spectral range of visible light, and a third spectral range of visible light. The second spectral range does not overlap with the first spectral range, and the third spectral range does not overlap with the first spectral range and the second spectral range. The multi-bandpass optical interference filter is further configured to prevent passage of a fourth spectral range of near-infrared light. An angle shift associated with each spectral range, of the first spectral range, the second spectral range, and the third spectral range, is less than or equal to 2.0% of a center wavelength of the spectral range for angles of incidence between 0 and 30 degrees.

20 Claims, 14 Drawing Sheets

(56) References Cited

U.S. PATENT DOCUMENTS

| | | | | |
|---|---|---|---|---|
| 2016/0342018 | A1* | 11/2016 | Xue | G03F 7/0007 |
| 2018/0335554 | A1 | 11/2018 | Ockenfuss | |
| 2019/0057993 | A1* | 2/2019 | Hsieh | H10F 39/024 |
| 2019/0080668 | A1 | 3/2019 | Holenarsipur et al. | |
| 2019/0165021 | A1* | 5/2019 | Ono | G02B 5/208 |
| 2019/0319058 | A1* | 10/2019 | Imoto | G02B 5/201 |
| 2020/0209448 | A1* | 7/2020 | Rowlands | C23C 28/42 |
| 2021/0157171 | A1 | 5/2021 | Valentine | |
| 2022/0372181 | A1* | 11/2022 | Iwata | C08F 220/1806 |
| 2024/0194712 | A1* | 6/2024 | Nakata | H10F 39/182 |

OTHER PUBLICATIONS

Extended European Search Report for Application No. EP22183447.6, mailed on Feb. 27, 2023, 12 pages.

Partial European Search Report for Application No. EP22183447.6, mailed on Nov. 25, 2022, 13 pages.

* cited by examiner

400

| | Optical Filter 106 | Multi-Bandpass Optical Filter 110 |
|---|---|---|
| Color Shift: Red (AOI: 0° – 30°) | 30 nm | 12 nm |
| Color Shift: Green (AOI: 0° – 30°) | 25 nm | 10 nm |
| Color Shift: Blue (AOI: 0° – 30°) | 21 nm | 8 nm |
| Effective Refractive Index ($n_{eff}$) | 1.65 | 2.65 |

FIG. 4

MULTI-BANDPASS OPTICAL INTERFERENCE FILTER

RELATED APPLICATION

This application claims priority to U.S. Provisional Patent Application No. 63/219,142, filed on Jul. 7, 2021, and entitled "LOW ANGLE SHIFT TRIPLE BANDPASS NEAR INFRARED CUT FILTER," the content of which is incorporated by reference herein in its entirety.

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The array of sensor elements may be associated with an optical filter. The optical filter may include a passband associated with a first wavelength range of light that is passed to the array of sensor elements. The optical filter may be associated with blocking a second wavelength range of light from being passed to the array of sensor elements.

SUMMARY

In some implementations, an optical device includes an optical sensor; a dye-based optical filter disposed on the optical sensor; and a multi-bandpass optical interference filter disposed over the dye-based optical filter, configured to: pass a first spectral range of visible light; pass a second spectral range of visible light, wherein the second spectral range does not overlap with the first spectral range; pass a third spectral range of visible light, wherein the third spectral range does not overlap with the first spectral range and does not overlap with the second spectral range; and prevent passage of a fourth spectral range of near-infrared light.

In some implementations, an optical device includes a multi-bandpass optical interference filter configured to: pass at least three non-overlapping spectral ranges of visible light, wherein an angle shift associated with each spectral range, of the at least three non-overlapping spectral ranges, is less than or equal to 2.0% of a center wavelength of the spectral range for angles of incidence between 0 and 30 degrees.

In some implementations, a multi-bandpass optical interference filter includes a set of layers disposed on a substrate, wherein: a first subset of layers, of the set of layers, includes a first material; a second subset of layers, of the set of layers, includes a second material that is different than the first material; the first subset of layers and the second subset of layers are disposed on the substrate in an alternating layer order; and the multi-bandpass optical interference filter is configured to pass at least three non-overlapping spectral ranges of light, wherein an angle shift associated with each spectral range, of the at least three non-overlapping spectral ranges, is less than or equal to 2.0% of a center wavelength of the spectral range for angles of incidence between 0 and 30 degrees.

BRIEF DESCRIPTION OF THE DRAWINGS

FIG. 4 is a table that indicates example respective angle shift characteristics of the optical filter and the multi-bandpass optical interference filter described herein.

DETAILED DESCRIPTION

Figures 1A, 1B, 1C:
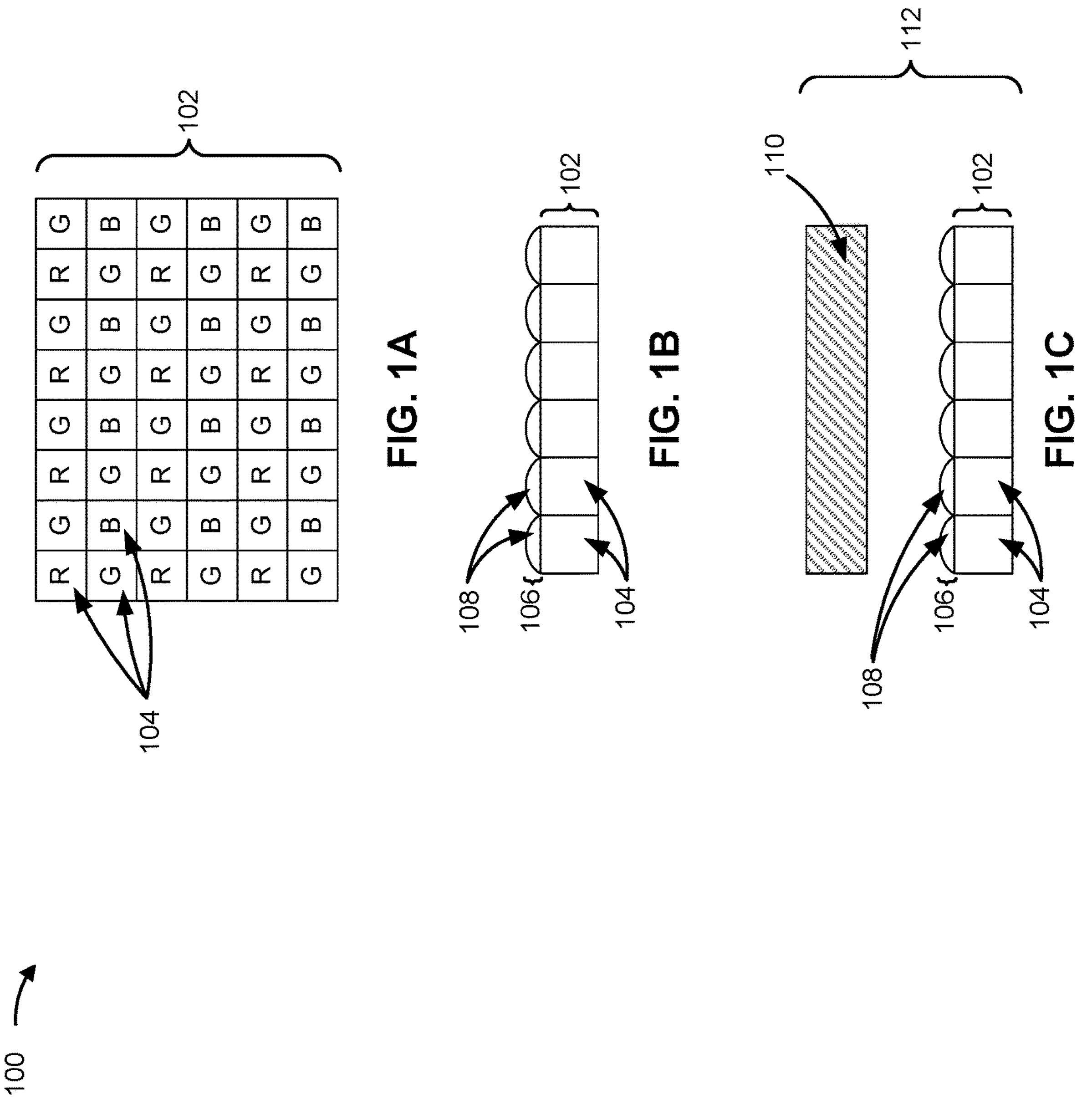
FIGS. 1A-1D are diagrams of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

Optical sensors are used in optical devices, such as imaging devices (e.g., cameras) structured light devices, time-of-flight (ToF) devices, ambient light sensor (ALS) devices, and/or spectrometer devices, among other examples, to convert optical signals into electrical signals, which allows for generation of sensor data (e.g., related to a subject associated with the optical signals). Typically, an optical filter is disposed over a plurality of sensor elements of an optical sensor. For example, a color filter array (CFA) is often disposed over a plurality of sensor elements of a color image sensor, where the CFA includes different sets of color passband channels, such as respective sets of channels that pass red light, green light, and blue light to the sensor elements of the color image sensor.

In some cases, absorption filters formed using dyes are used as CFAs. But, such dye-based color filters have relatively broad color passbands, resulting in a reduced color gamut (e.g., and therefore providing fewer colors and less brilliant colors). Further, the color passbands undergo relatively large center-wavelength shifts with changes in incidence angle, resulting in undesirable shifts in color, which inhibit a color sensing accuracy of the color image sensor. In addition to transmitting visible light in color passbands, dye-based CFAs also transmit infrared (IR) light, which contributes to noise. Therefore, an IR-blocking filter is typically disposed over a dye-based CFA to prevent passage of IR light.

Some implementations described herein are directed to an optical device that includes a multi-bandpass optical interference filter. The multi-bandpass optical interference filter passes multiple non-overlapping spectral ranges of light, such as at least three non-overlapping spectral ranges of visible light (e.g., red light, green light, and blue light). The spectral ranges are narrower than the passbands of a CFA, and therefore the multi-bandpass optical interference filter provides an increased color gamut, which enables detection of more colors and/or more brilliant colors of an optical sensor of the optical device that receives light that is passed by the multi-bandpass optical interference filter. Further, the multi-bandpass optical interference filter is configured to minimize an angle shift associated with each spectral range of the non-overlapping spectral ranges. In this way, the multi-bandpass optical interference filter reduces an amount of unwanted or undesired light that is passed by the multi-bandpass optical interference filter, which improves a sensing accuracy of the optical sensor that receives light that is passed by the multi-bandpass optical interference filter. Additionally, the multi-bandpass optical interference filter prevents passage of at least one other spectral range of light, such as a spectral range of near-infrared (NIR) light. In this way, the multi-bandpass optical interference filter minimizes an amount of noise that is detected by the optical sensor and therefore further improves a sensing accuracy of the optical sensor.

FIGS. 1A-1D are diagrams of an example implementation 100 described herein. FIG. 1A shows a top-down view of an optical sensor 102. The optical sensor 102 includes a device capable of performing a measurement of light, such as an optical sensor, a spectral sensor, and/or an image sensor. For example, the optical sensor 102 may perform a sensor measurement of light directed toward the optical sensor 102. The optical sensor 102 may utilize one or more sensor technologies, such as a complementary metal-oxide-semiconductor (CMOS) technology and/or a charge-coupled device (CCD) technology, among other examples.

The optical sensor 102 may include a plurality of sensor elements 104 (e.g., an array of sensor elements 104, also referred to herein as a sensor array), each configured to obtain information. For example, a sensor element 104 may provide an indication of intensity of light that is incident on the sensor element 104 (e.g., active/inactive, or a more granular indication of intensity). As another example, a sensor element 104 may provide an indication of a wavelength or wavelength range of light (also referred to herein as a spectral range of light) that is incident on the sensor element 104 (e.g., red light, blue light, green light, ultraviolet light, infrared light, and/or the like). The plurality of sensor elements 104 may be arranged in a particular pattern, such as a red-green-blue (RGB) Bayer pattern shown in FIG. 1A, where sensor elements 104 with an "R" label are configured to provide an indication of red light, sensor elements 104 with a "G" label are configured to provide an indication of green light, and sensor elements 104 with a "B" label are configured to provide an indication of blue light. Red light may include one or more portions of a spectral range between 620 and 750 nanometers (nm) (e.g., light with a wavelength that is greater than or equal to 620 nm and less than or equal to 750 nm), green light may include one or more portions of a spectral range between 500 and 570 nm, and blue light may include one or more portions of a spectral range between 450 and 499 nm. While some implementations described herein are directed to the plurality of sensor elements 104 arranged in an RGB Bayer pattern, some implementations are directed to the plurality of sensor elements 104 arranged in one or more other patterns, such as a cyan-magenta-yellow (CMY) pattern (e.g., where sets of sensor elements 104 are configured to provide indications of cyan light (e.g., a combination of blue light and green light), magenta light (e.g., a combination of red light and blue light), and yellow light (e.g., a combination of red light and green light), respectively.

FIG. 1B shows a side view of the optical sensor 102 and an optical filter 106 that is disposed on a surface of the optical sensor 102 (e.g., an input surface of the optical sensor 102). The optical filter 106 may include one or more optical filter elements 108 that each include an optical dye, an absorptive pigment, or a similar material. Accordingly, the optical filter 106 may be referred to as a dye-based optical filter.

As shown in FIG. 1B, each optical filter element 108 may correspond to a sensor element 104 and may be disposed on a surface of the corresponding sensor element 104 (e.g., an input surface of the corresponding sensor element 104). Each optical filter element 108 may be configured to pass, block, and/or reflect light associated with particular spectral ranges that enter the optical filter element 108 (e.g., via an input surface of the optical filter element 108). In some implementations, each optical filter element 108 may be a bandpass filter. For example, each optical filter element 108 may be configured to pass light associated with a first spectral range and block and/or reflect light associated with a second spectral range.

With respect to the arrangement of the plurality of sensor elements 104, as shown in FIG. 1A, optical filter elements 108 that are configured to pass red light may be respectively disposed on sensor elements 104 that are configured to provide an indication of red light (e.g., shown with an "R" label), optical filter elements 108 that are configured to pass green light may be respectively disposed on the sensor elements 104 that are configured to provide an indication of green light (e.g., shown with a "G" label), and optical filter elements 108 that are configured to pass blue light may be respectively disposed on the sensor elements 104 that are configured to provide an indication of blue light (e.g., shown with a "B" label). While some implementations described herein are directed to the plurality of sensor elements 104 configured to passing RGB light, some implementations are directed to the plurality of sensor elements 104 configured to passing other light, such as CMY light.

FIG. 1C shows a side view of the optical sensor 102, the optical filter 106, and a multi-bandpass optical interference filter 110. In some implementations, the optical sensor 102, the optical filter 106, and the multi-bandpass optical interference filter 110 may be included in an optical device 112.

As shown in FIG. 1C, the multi-bandpass optical interference filter 110 may be disposed over the optical filter 106 (e.g., directly on the input surface of the optical filter 106, or separated by a gap). The multi-bandpass optical interference filter 110 may be configured to pass, block, and/or reflect light associated with a plurality of spectral ranges that enter the multi-bandpass optical interference filter 110, as further described herein. In some implementations, the multi-bandpass optical interference filter 110 may be a double-bandpass filter (e.g., configured to pass two spectral ranges of light), a triple-bandpass filter (e.g., configured to pass three spectral ranges of light), a quadruple-bandpass filter (e.g., configured to pass four spectral ranges of light), a quintuple-bandpass filter (e.g., configured to pass five spectral ranges of light), a sextuple-bandpass filter (e.g., configured to pass six spectral ranges of light), or a septuple-bandpass filter (e.g., configured to pass seven spectral ranges of light), among other examples.

In some implementations, the multi-bandpass optical interference filter 110 may be configured to pass a plurality of non-overlapping spectral ranges of light (e.g., the spectral ranges do not share any spectral range values, such that a maximum spectral range value and a minimum spectral range value of a first spectral range are less than, or, alternatively, greater than, both a maximum spectral range value and a minimum spectral range value of a second spectral range). For example, the multi-bandpass optical interference filter 110 may be configured to pass at least three non-overlapping spectral ranges of light (e.g., at least three non-overlapping spectral ranges of visible light, at least three non-overlapping spectral ranges of NIR light, or at least three non-overlapping spectral ranges of IR light, among other examples).

In a particular example (e.g., when the multi-bandpass optical interference filter 110 is a triple-bandpass optical filter), the multi-bandpass optical interference filter 110 may be configured to pass a first spectral range of light (e.g., visible light), pass a second spectral range of light (e.g., visible light), and pass a third spectral range of light (e.g., visible light), wherein the second spectral range does not overlap with the first spectral range, and the third spectral range does not overlap with the first spectral range and does not overlap with the second spectral range. The first spectral range may be associated with red light (e.g., the first spectral range may between 620 and 750 nm), the second spectral range may be associated with green light (e.g., the second spectral range may be between 500 and 570 nm), and the third spectral range may be associated with blue light (e.g., the third spectral range may be between 450 and 499 nm). That is, the multi-bandpass optical interference filter 110 may be an RGB triple-bandpass optical filter. In some implementations, the multi-bandpass optical interference filter 110 may be another type of triple-bandpass optical filter, such as a CMY triple-bandpass optical filter.

In some implementations, the multi-bandpass optical interference filter 110 may be configured to prevent passage (e.g., by blocking or absorbing) of at least one other spectral range of light. The at least one other spectral range of light may not overlap with the plurality of non-overlapping spectral ranges of light that the multi-bandpass optical interference filter 110 is configured to pass. With respect to the particular example described above, the multi-bandpass optical interference filter 110 may be configured to prevent a passage of a fourth spectral range of light that does not overlap with the first spectral range, the second spectral range, and the third spectral range. The fourth spectral range may be associated with, for example, near-infrared (NIR) light (e.g., the fourth spectral range may be between 751 and 1100 nm). That is, the multi-bandpass optical interference filter 110 may be an MR-cut optical filter.

In some implementations, with further respect to the particular example described above, such as when the optical filter 106 and the multi-bandpass optical interference filter 110 are included in the optical device 112 and the optical filter 106 is a dye-based triple-bandpass optical filter, the optical filter 106 may be configured to pass a fifth spectral range of light (e.g., visible light), pass a sixth spectral range of light (e.g., visible light), and pass a seventh spectral range of light (e.g., visible light and MR light). The fifth spectral range may be associated with blue light (e.g., the fifth spectral range may between 450 and 499 nm) and therefore may overlap with the third spectral range that is associated with blue light (e.g., that is passed by the multi-bandpass optical interference filter 110), the sixth spectral range may be associated with green light (e.g., the sixth spectral range may between 500 and 570 nm) and therefore may overlap with the second spectral range that is associated with green light (e.g., that is passed by the multi-bandpass optical interference filter 110), and the seventh spectral range may be associated with red light and MR light (e.g., the seventh spectral range may between 620 and 1100 nm) and therefore may overlap with the first spectral range that is associated with red light (e.g., that is passed by the multi-bandpass optical interference filter 110) and the fourth spectral range that is associated with MR light (e.g., that is blocked by the multi-bandpass optical interference filter 110).

Accordingly, with respect to the arrangement of the plurality of sensor elements 104, as shown in FIG. 1A, red light that overlaps with the first spectral range and the seventh spectral range may be passed by the multi-bandpass optical interference filter 110 and the optical filter 106 to the sensor elements 104 that are configured to provide an indication of red light (e.g., shown with an "R" label), green light that overlaps with the second spectral range and the sixth spectral range may be passed by the multi-bandpass optical interference filter 110 and the optical filter 106 to the sensor elements 104 that are configured to provide an indication of green light (e.g., shown with a "G" label), and blue light that overlaps with the third spectral range and the fifth spectral range may be passed by the multi-bandpass optical interference filter 110 and the optical filter 106 to the sensor elements 104 that are configured to provide an indication of blue light (e.g., shown with a "B" label). The plurality of sensor elements 104 may thereby collect information related to the passed red light, green light, and blue light. Additionally, or alternatively, red light that does not overlap with the first spectral range and the seventh spectral range, green light that does not overlap with the second spectral range and the sixth spectral range, blue light that does not overlap with the third spectral range and the fifth spectral range, MR light associated with the fourth spectral range, and MR light associated with the seventh spectral range may not be passed by the multi-bandpass optical interference filter 110 and the optical filter 106, and therefore may not transmit to the plurality of sensor elements 104.

In some implementations, the optical sensor 102 may be configured to collect the information obtained by the plurality of sensor elements 104 to generate sensor data regarding light that passes through the multi-bandpass optical interference filter 110 and the optical filter 106 to the optical sensor 102 (e.g., related to the passed red light, green light, and blue light, with respect to the particular example described above). For example, the multi-bandpass optical interference filter 110, the optical filter 106, and the optical sensor 102 may be included in the optical device 112, which may be associated with a sensing device, such as an imaging device (e.g., a visual and/or MR illuminated imaging device), a structured light device, a ToF device, an ALS device, and/or a spectrometer device, among other examples. Accordingly, the optical sensor 102 may generate sensor data related to a subject (e.g., an image of, a distance to, a depth of, an amount or types of light associated with, or other spectral information related to, the subject).

Figure 1D:
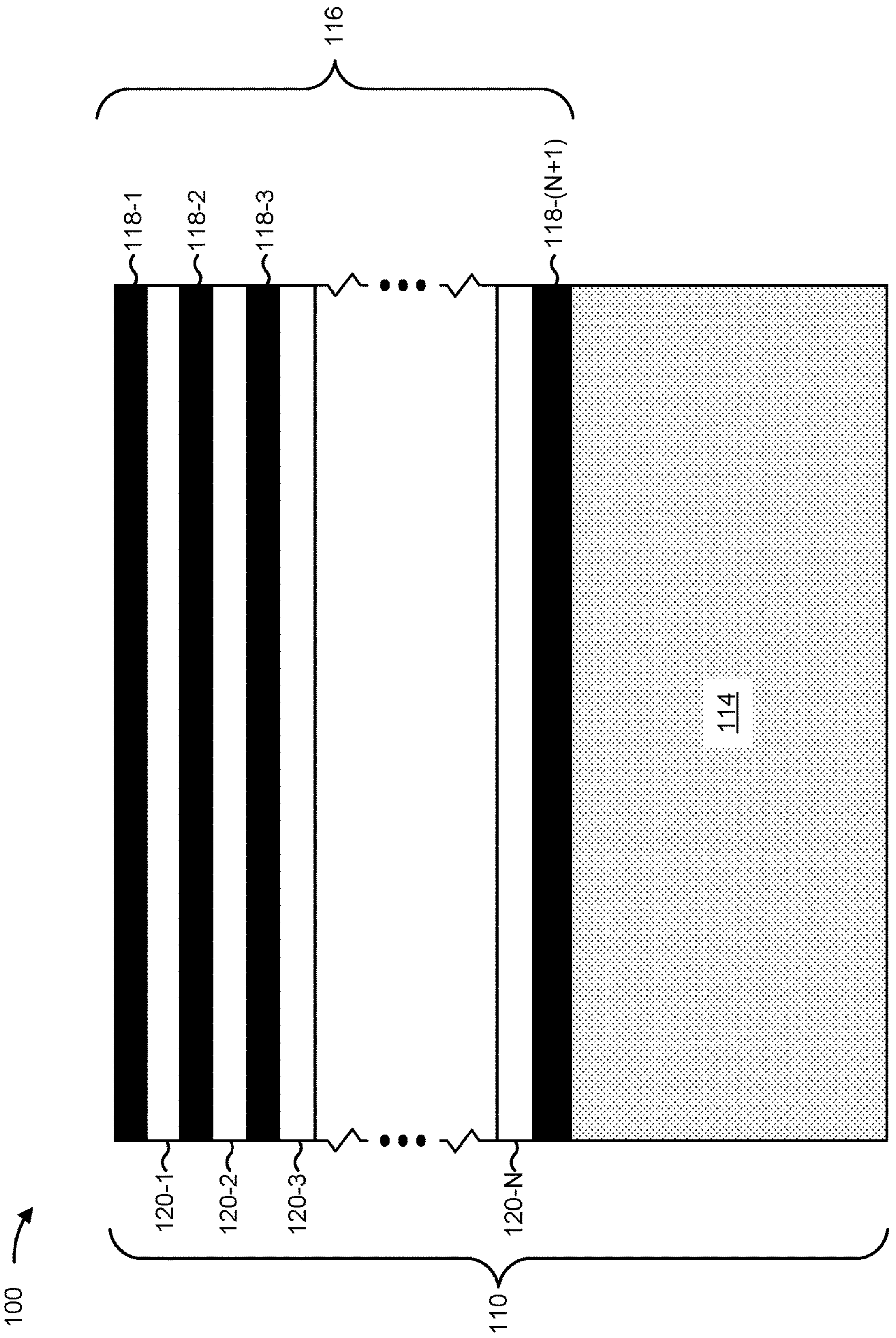

FIG. 1D shows an example stack up of the multi-bandpass optical interference filter 110. As further shown in FIG. 1D, the multi-bandpass optical interference filter 110 may include a substrate 114 and a set of layers 116.

The substrate 114 may comprise a glass substrate, a polymer substrate, a polycarbonate substrate, a metal substrate, a silicon (Si) substrate, a germanium (Ge) substrate, or an active device wafer (e.g., that comprises a photodiode (PD), a PD array, an avalanche photodiode (APD), an APD array, a CCD sensor, and/or a CMOS sensor, among other examples). In some implementations, a thickness of the substrate 114 may be greater than or equal to 20 microns (μm), 50 μm, and/or 500 μm. Additionally, or alternatively, the thickness of the substrate 114 may be less than or equal to a particular thickness threshold. The particular thickness threshold, for example, may be less than or equal to 5 millimeters (mm).

The set of layers 116 (e.g., a set of optical filter layers) may be disposed on (e.g., directly on) the substrate 114 and may include one or more subsets of layers. For example, the set of layers 116 may include a first subset of layers 118 (e.g., a first subset of layers 118-1 through 118-(N+1) (N≥1)) (also referred to herein as A layers) and a second subset of layers 120 (e.g., a second subset of layers 120-1 through 120-N) (also referred to herein as B layers). In some implementations, the first subset of layers 118 and the second subset of layers 120 may be arranged in a particular order (e.g., an alternating layer order), such as an $(A\text{-}B)_m$ (m≥1) order, an $(A\text{-}B)_m$-A order, a $(B\text{-}A)_m$ order, a $B\text{-}(B\text{-}A)_m$ order, or another order. For example, as shown in FIG. 1D, the first subset of layers 118 and the second subset of layers 120 are positioned in an $(A\text{-}B)_N$-A order with an A layer (e.g., layer 118-1) disposed at a surface (e.g., a top surface) of the multi-bandpass optical interference filter 110 and an A layer (e.g., layer 118-(N+1)) disposed on a surface (e.g., a top surface) of the substrate 114.

In some implementations, the set of layers 116 may be disposed on a single surface (e.g., the top surface) of the substrate 114 (e.g., as shown in FIG. 1D). Alternatively, a first portion of the set of layers 116 may be disposed on a first surface (e.g., the top surface) of the substrate 114, and a second portion of the set of layers 116 may be disposed on a second surface (e.g., a bottom surface) of the substrate 114. For example, a first portion of the first subset of layers 118 and a first portion of the second subset of layers 120 may be arranged in a first particular order on the first surface of the substrate 114, and a second portion of the first subset of layers 118 and a second portion of the second subset of layers 120 may be arranged in a second particular order on the second surface of the substrate 114.

In some implementations, one or more other layers may be included in the multi-bandpass optical interference filter 110, such as one or more protective layers, one or more cap layers (e.g., to provide environmental protection to the set of layers 116), and/or one or more layers to provide one or more other filtering functionalities (e.g., a blocker or an anti-reflection coating, among other examples). For example, in a single surface configuration, an additional layer (e.g., a cap layer), such as a dielectric layer (e.g., that comprises an oxide material, such as a silicon dioxide ($SiO_2$) material, a zirconium dioxide ($ZrO_2$) material, and/or an yttrium oxide ($Y_2O_3$) material; a nitride material, such as a silicon nitride ($Si_3N_4$) material, a titanium nitride (TiN) material, and/or a zirconium nitride (ZrN) material; and/or another material that provides environmental protection), may be disposed on a surface (e.g., a top surface) of the set of layers 116. As another example, in a dual surface configuration, a first additional layer may be disposed on a surface (e.g., a top surface) of the first portion of the set of layers 116 and a second additional layer may be disposed on a surface (e.g., a bottom surface) of the second portion of the set of layers 116.

The first subset of layers 118 may comprise, for example, an oxide material (e.g. a niobium-titanium-oxide (NbTiOx) material, a niobium oxide (NbOx) material, a titanium oxide (TiOx) material, and/or tantalum oxide (TaOx) material), a nitride material (e.g., that includes a silicon nitride (SiN) material and/or an aluminum nitride (AlN) material), a silicon material (e.g., that includes a silicon and hydrogen (SiH) material, a hydrogenated silicon (Si:H) material, a silicon carbide (SiC) material, and/or a silicon (Si) material), and/or a germanium (Ge) material. The second subset of layers 120 may comprise at least one other material (e.g., at least one material that is different than the material included in the first subset of layers 118), such as at least one of an Si material, an SiH material, an Si:H material, a hydrogenated silicon with helium (Si:H—He) material, an amorphous silicon (a-Si) material, an SiN material, a Ge material, a hydrogenated germanium (Ge:H) material, a silicon germanium (SiGe) material, a hydrogenated silicon germanium (SiGe:H) material, an SiC material, a hydrogenated silicon carbide (SiC:H) material, a silicon dioxide ($SiO_2$) material, a tantalum pentoxide ($Ta_2O_5$) material, a niobium pentoxide ($Nb_2O_5$) material, a niobium titanium oxide (NbTiOx) material, a niobium tantalum pentoxide ($Nb_{2-x}Ta_xO_5$) material, a titanium dioxide ($TiO_2$) material, an aluminum oxide ($Al_2O_3$) material, a zirconium oxide ($ZrO_2$) material, an yttrium oxide ($Y_2O_3$) material, or a hafnium oxide ($HfO_2$) material, among other examples. For example, each layer 120, of the second subset of layers 120, may comprise at least one other material.

In some implementations, each layer of the set of layers 116 may be associated with a particular thickness. For example, a layer of the first subset of layers 118 or the second subset of layers 120 may have a thickness of between 5 and 2000 nm. In some implementations, the first subset of layers 118 or the second subset of layers 120 may be associated with multiple thicknesses, such as a first thickness for the first subset of layers 118 and a second thickness for the second subset of layers 120, a first thickness for a first portion of the first subset of layers 118 and a second thickness for a second portion of the first subset of layers 118, or a first thickness for a first portion of the second subset of layers 120 and a second thickness for a second portion of the second subset of layers 120, among other examples. Accordingly, a layer thickness and/or a quantity of layers may be selected based on an intended set of optical characteristics of the multi-bandpass optical interference filter 110, such as an intended number of passbands, intended center wavelengths of the passbands, intended transmissivities of the passbands, and/or other optical characteristics. For example, the layer thickness and/or the quantity of layers may be selected to permit the multi-bandpass optical interference filter 110 to be utilized for (e.g., to pass light associated with) red light (e.g., pass one or more portions of a spectral range between 620 and 750 nm), green light (e.g., pass one or more portions of a spectral range between 500 and 570 nm), and blue light (e.g., pass one or more portions of a spectral range between 450 and 499 nm), and/or other light (e.g., ultraviolet (UV) light, MR light, and/or other light). In some implementations, the set of layers 116 may be configured to pass a threshold percentage of light associated with a particular spectral range. The threshold range, for example, may be greater than or equal to 85%.

In some implementations, the first subset of layers 118 may have a first refractive index with a first value and the second subset of layers 120 may have a second refractive index with a second value (e.g., that is different than the first value). For example, a refractive index of the first subset of layers 118 may be between 1.9 and 2.2 for light that has a wavelength that is between 500 and 5500 nm, and/or a refractive index of the second subset of layers 120 may be between 3.5 and 3.9 for light that has a wavelength that is between 500 and 5500 nm. In some implementations, the multi-bandpass optical interference filter 110 may have an effective refractive index greater than or equal to 95% of a highest value of the first value and the second value. For example, when the first subset of layers 118 and the second subset of layers 120 are arranged in a particular layer order (e.g., an alternating layer order of high refractive index and low refractive index layers), the first subset of layers 118 and the second subset of layers 120 may be sized to achieve an effective refractive index of, for example, greater than or equal to 95% of a highest value of the first value and the second value. In some implementations, multi-bandpass optical interference filter 110 may have an effective refractive index greater than or equal to 100% of the highest value of the first value and the second value (e.g., up to 110%, 120%, 130%, 140%, or 150% of the highest value). Accordingly, for example, the effective refractive index may be greater than or equal to 3.7, 4.0, 4.5, 5.0, and/or 5.5 when the refractive index of the second subset of layers 120 is between 3.5 and 3.9 and greater than the refractive index of the first subset of layers 118.

In some implementations, such as when multi-bandpass optical interference filter 110 is configured to pass at least three non-overlapping spectral ranges of light, an angle shift associated with each spectral range, of the at least three non-overlapping spectral ranges, may be less than or equal to a threshold shift percentage of a center wavelength of the spectral range for angles of incidence (AOIs) between 0 and 30 degrees. The threshold shift percentage may be, for example, less than or equal to 1.0%, 1.5%, 2.0%, 2.5%, and/or 3.0%. For example, when the multi-bandpass optical interference filter 110 is configured to pass red light that has a center wavelength of 685 nm, the multi-bandpass optical interference filter 110 may have an angle shift of, for example, less than or equal to 13.7 nm at AOIs of up to and including 30 degrees (e.g., for a threshold shift percentage of 2.0%). In some implementations, an angle shift associated with each spectral range, of the at least three non-overlapping spectral ranges, may be less than or equal to a threshold shift amount for AOIs between 0 and 30 degrees, where the threshold shift amount is less than or equal to, for example, 10 nm, 15 nm, 20 nm, and/or 25 nm.

As indicated above, FIGS. 1A-1D are provided as an example. Other examples may differ from what is described with regard to FIGS. 1A-1D.

Figure 2A:
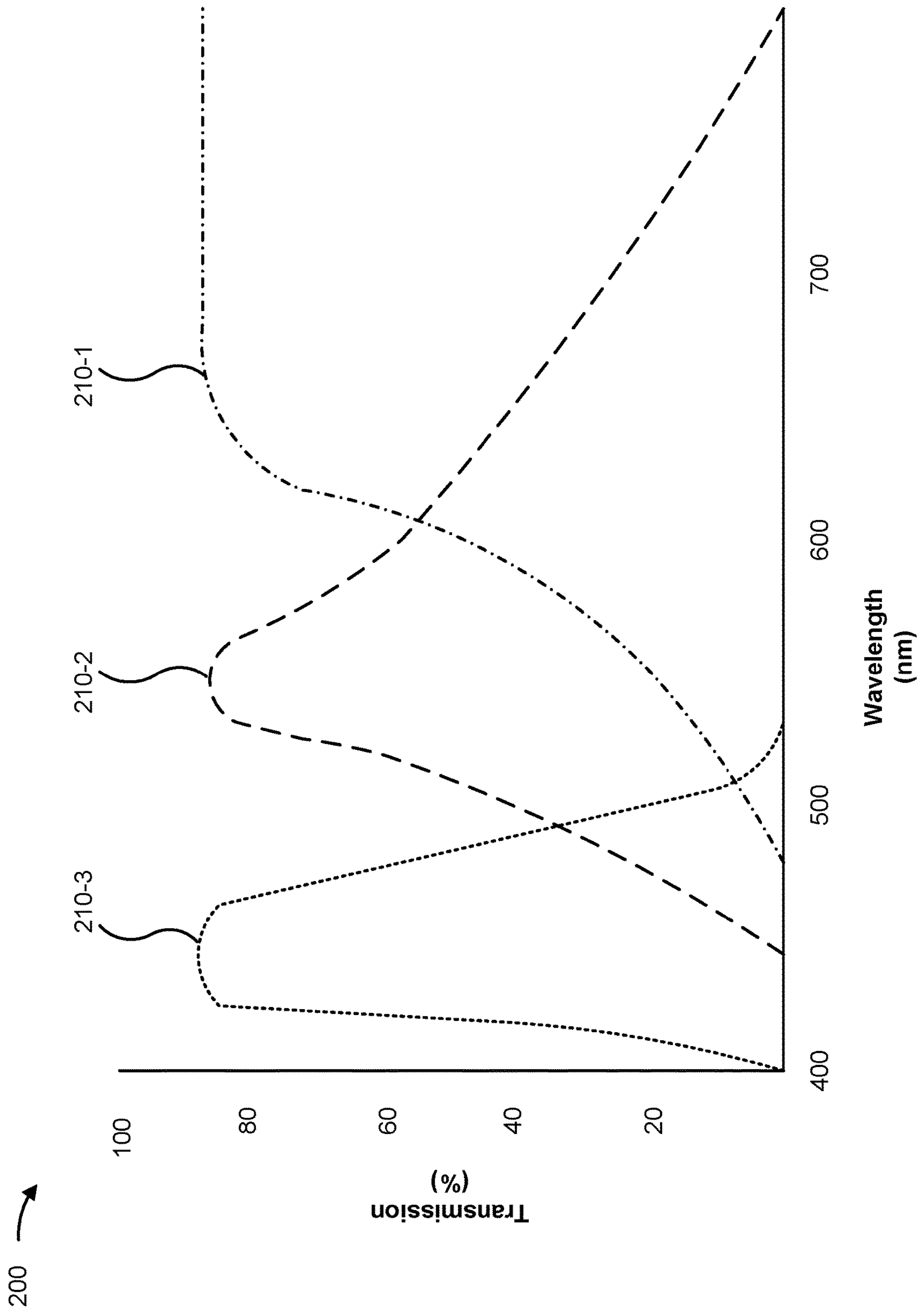
FIGS. 2A-2B are diagrams of example optical characteristics of an optical filter described herein.
Figure 2B:
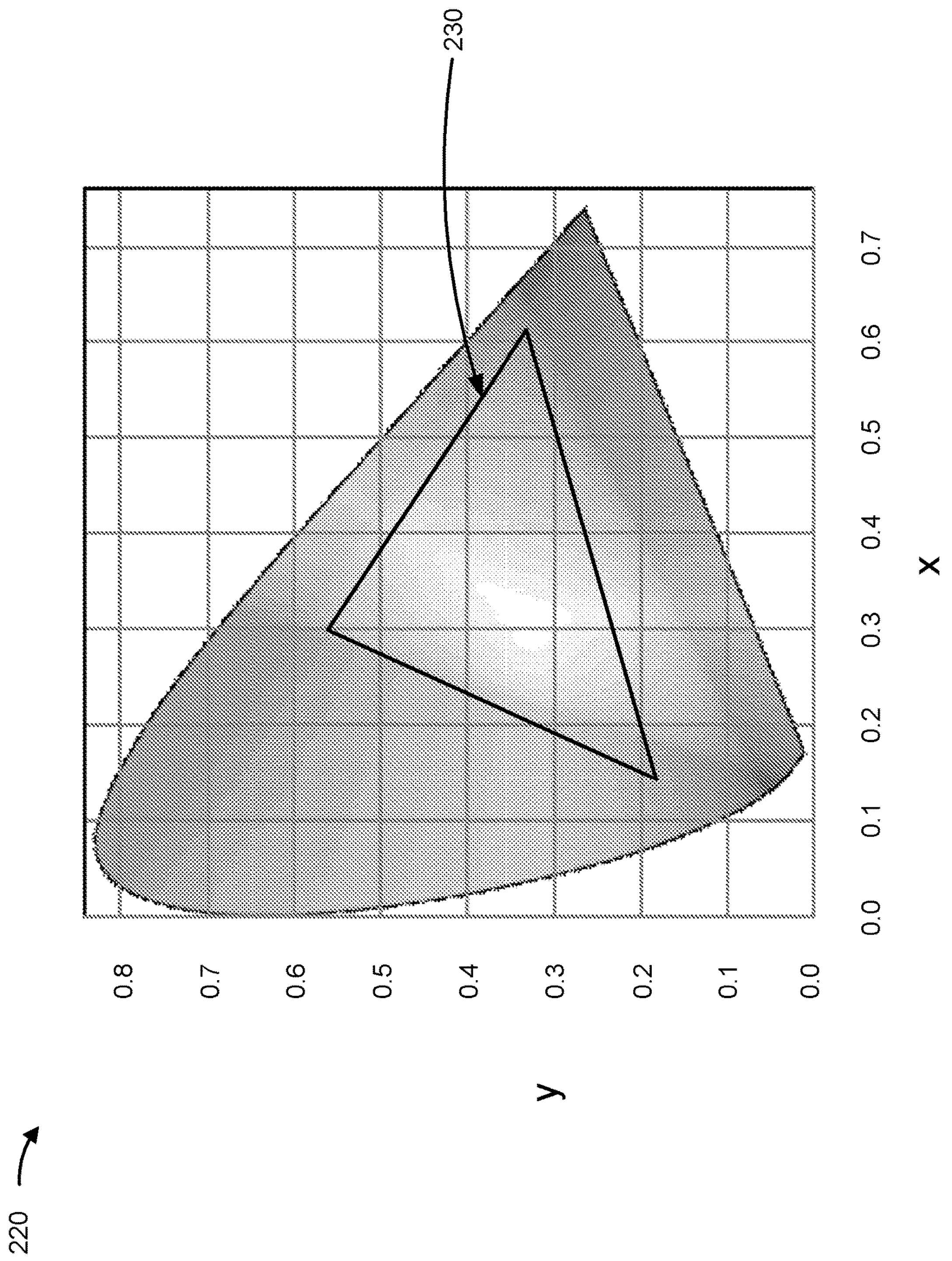

FIGS. 2A-2B are diagrams of example optical characteristics of the optical filter 106 described herein, such as when the optical filter 106 includes an array of dye-based optical filter elements 108 (e.g., the optical filter 106 is a dye-based RGB optical filter). FIG. 2A is a diagram of an example plot 200 that shows a transmittance performance 210 of the optical filter 106 (e.g., a red light transmittance performance 210-1, a green light transmittance performance 210-2, and a blue light transmittance performance 210-3). As shown in FIG. 2A, the optical filter 106 may transmit greater than a threshold amount (e.g., that is greater than or equal to 85%) of each of red light (e.g., one or more portions of a spectral range between 620 and 750 nm) via optical filter elements 108 that are configured to pass red light (e.g., centered at about 685 nm, as shown by reference number 210-1), green light (e.g., one or more portions of a spectral range between 500 and 570 nm) via optical filter elements 108 that are configured to pass green light (e.g., centered at about 545 nm, as shown by reference number 210-2), and blue light (e.g., one or more portions of a spectral range between 450 and 499 nm) via optical filter elements 108 that are configured to pass blue light (e.g., centered at about 460 nm, as shown by reference number 210-3). Notably, the optical filter 106 may also transmit greater than the threshold amount of MR light (e.g., one or more portions of a spectral range between 751 and 1100 nm), such as via the optical filter elements 108 that are configured to pass red light. That is, the optical filter 106 may be configured to pass visual light (e.g., RGB light) and non-visual light (e.g., MR light). FIG. 2B is a diagram of an example Commission Internationale de L'éclairage (CIE) chromaticity plot 220 indicating a color gamut 230 of the optical filter 106.

As indicated above, FIGS. 2A-2B are provided as an example. Other examples may differ from what is described with regard to FIGS. 2A-2B.

Figure 3A:
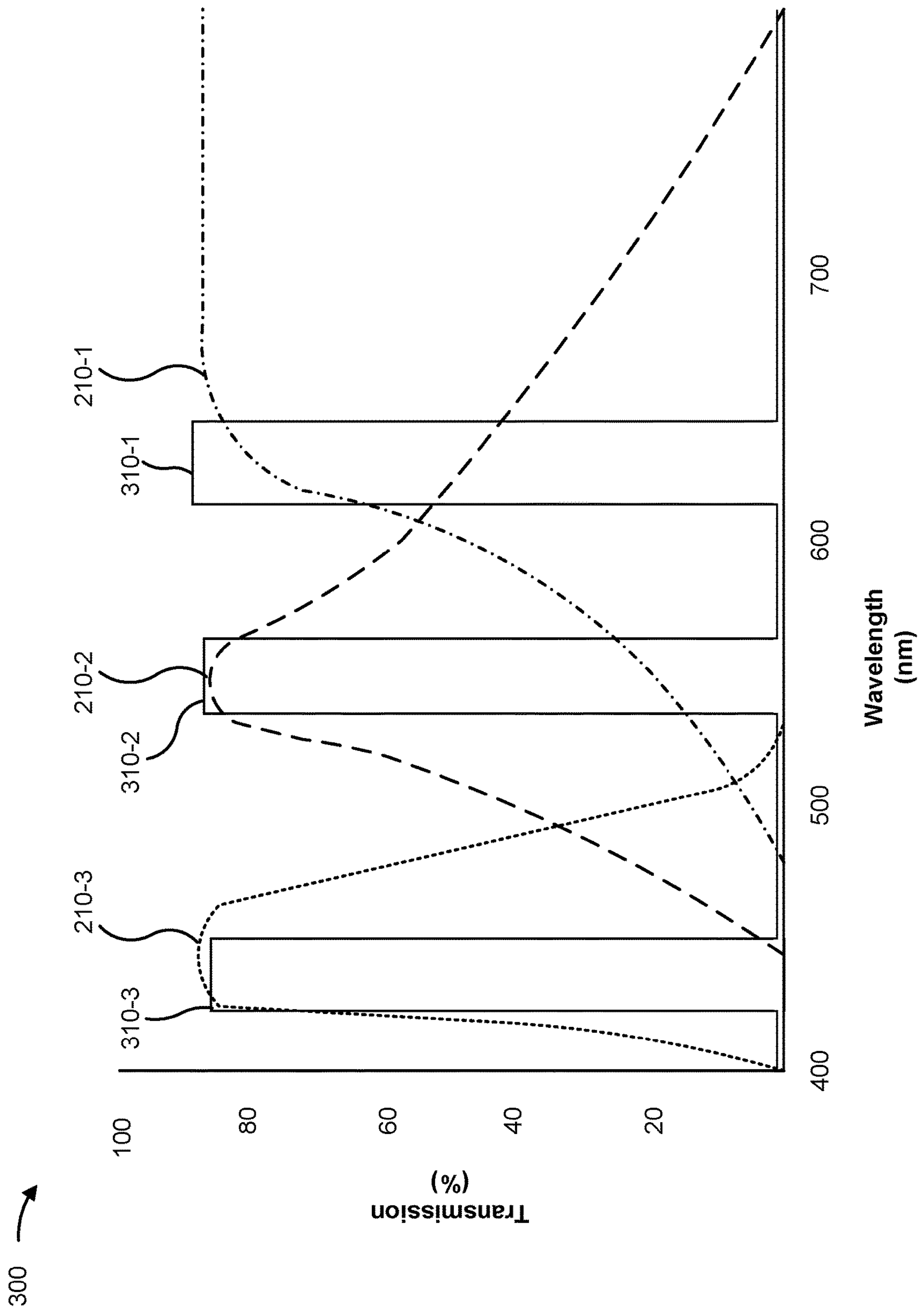
FIGS. 3A-3B are diagrams of example optical characteristics of a multi-bandpass optical interference filter described herein.
Figure 3B:
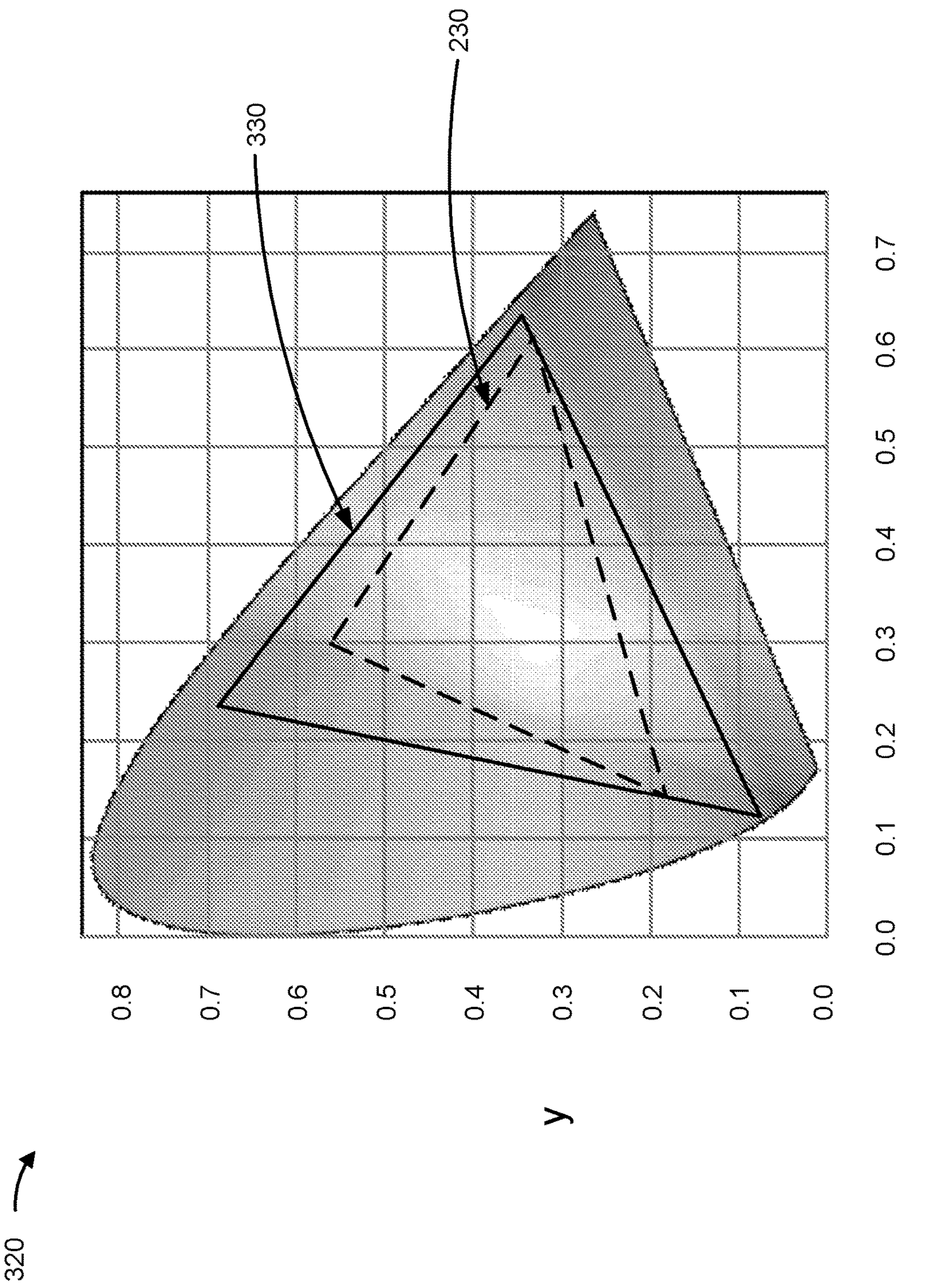

FIGS. 3A-3B are diagrams of example optical characteristics of the multi-bandpass optical interference filter 110 described herein, such as when the multi-bandpass optical interference filter 110 is an RGB triple-bandpass optical filter. FIG. 3A is a diagram of an example plot 300 that shows a transmittance performance 310 of the multi-bandpass optical interference filter 110 (e.g., a red light transmittance performance 310-1, a green light transmittance performance 310-2, and a blue light transmittance performance 310-3) overlaid on the transmittance performance 210 of the optical filter 106. As shown in FIG. 3A, the multi-bandpass optical interference filter 110 may transmit greater than a threshold amount (e.g., that is greater than or equal to 85%) of each of red light (e.g., centered at about 635 nm), green light (e.g., centered at about 560 nm), and blue light (e.g., centered at about 430 nm). As further shown in FIG. 3A, the individual bandpass ranges (e.g., for red light, green light, and blue light) of the multi-bandpass optical interference filter 110 may be narrower than those of the optical filter 106, which allows the multi-bandpass optical interference filter 110 to provide higher color measurement accuracy than the optical filter 106. Additionally, the multi-bandpass optical interference filter 110 may also block and/or reflect MR light, which is not blocked and/or reflected by the optical filter 106. That is, the multi-bandpass optical interference filter 110 may be configured to pass visual light (e.g., RGB light) and to prevent passage of non-visual light (e.g., MR light). In this way, the multi-bandpass optical interference filter 110 may be configured to be an MR-cut optical filter.

FIG. 3B is a diagram of an example CIE chromaticity plot 320 indicating a color gamut 330 of the multi-bandpass optical interference filter 110. As shown in FIG. 3B, the color gamut 330 of the multi-bandpass optical interference filter 110 may be larger (e.g., may include more colors) than the color gamut 230 of the optical filter 106.

As indicated above, FIGS. 3A-3B are provided as an example. Other examples may differ from what is described with regard to FIGS. 3A-3B.

FIG. 4 is a table 400 that indicates example respective angle shift characteristics of the optical filter 106 and the multi-bandpass optical interference filter 110. As shown in FIG. 4, from a 0 (zero) degree angle of incidence (AOI) to a 30 degree AOI, a center wavelength associated with red light that is passed by the optical filter 106 may shift 30 nm, a center wavelength associated with green light that is passed by the optical filter 106 may shift 25 nm, and a center wavelength associated with blue light that is passed by the optical filter 106 may shift 21 nm. In comparison, as further shown in FIG. 4, from a 0 degree AOI to a 30 degree AOI, a center wavelength associated with red light that is passed by the multi-bandpass optical interference filter 110 may shift 12 nm, a center wavelength associated with green light that is passed by the multi-bandpass optical interference filter 110 may shift 10 nm, and a center wavelength associated with blue light that is passed by the multi-bandpass optical interference filter 110 may shift 8 nm. As further shown in FIG. 4, the effective refractive index ($n_{eff}$) of the optical filter 106 and the multi-bandpass optical interference filter 110 may be greater than or equal to 1.65 and greater than or equal to 2.65, respectively.

As indicated above, FIG. 4 is provided as an example. Other examples may differ from what is described with regard to FIG. 4.

Figure 5A:
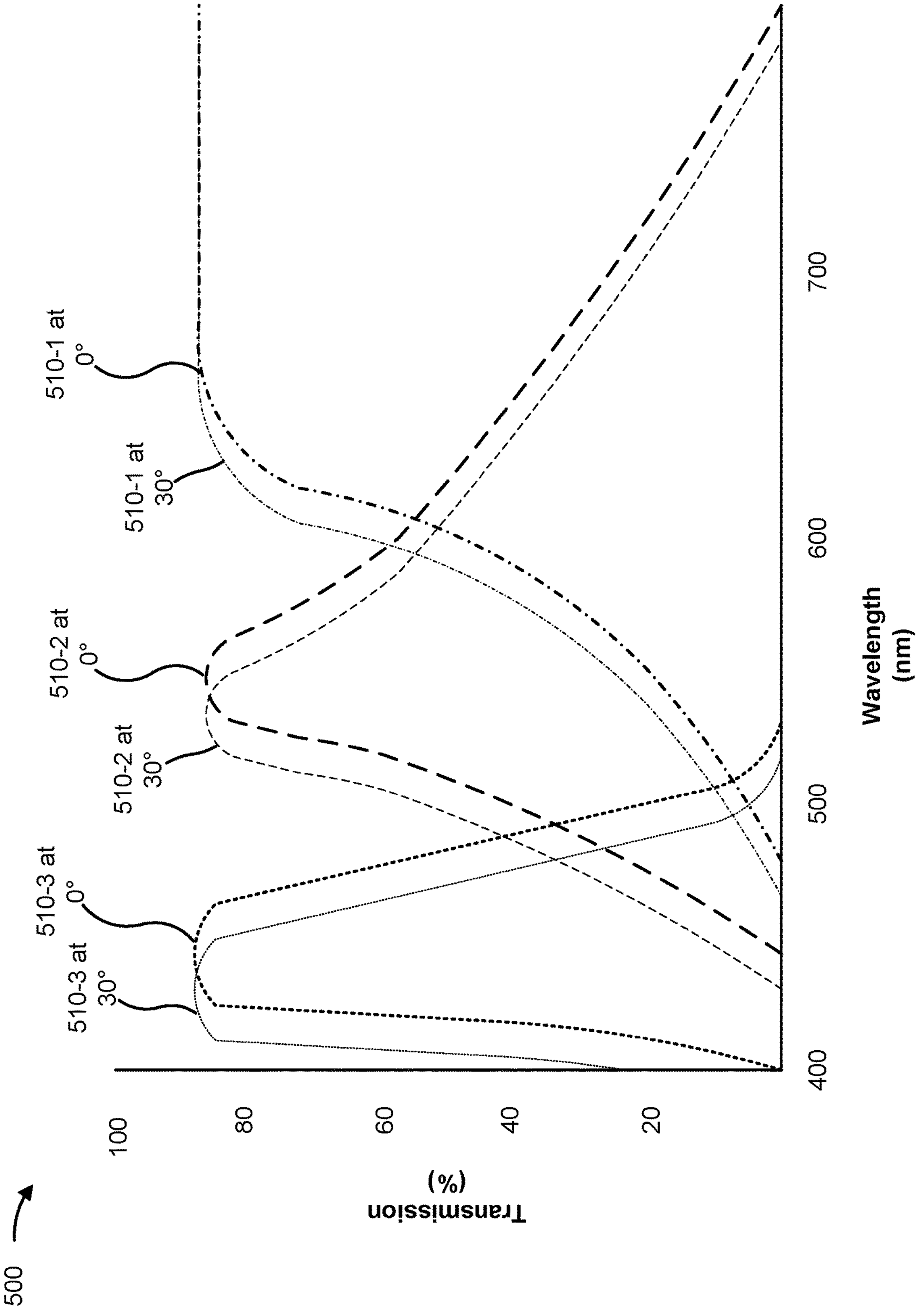
FIGS. 5A-5C are diagrams of example angle shift characteristics of the optical filter and the multi-bandpass optical interference filter described herein.
Figure 5B:
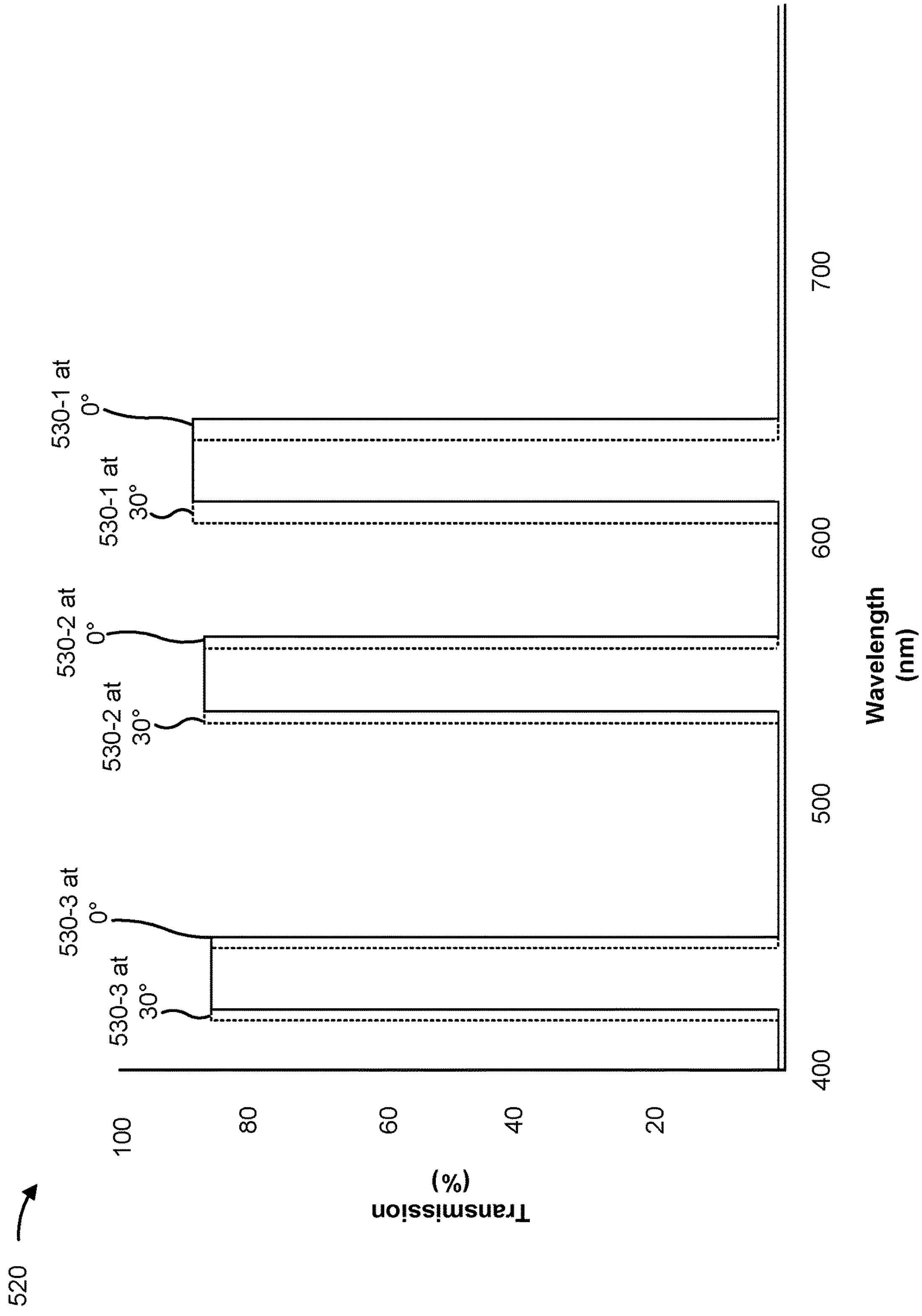
Figure 5C:
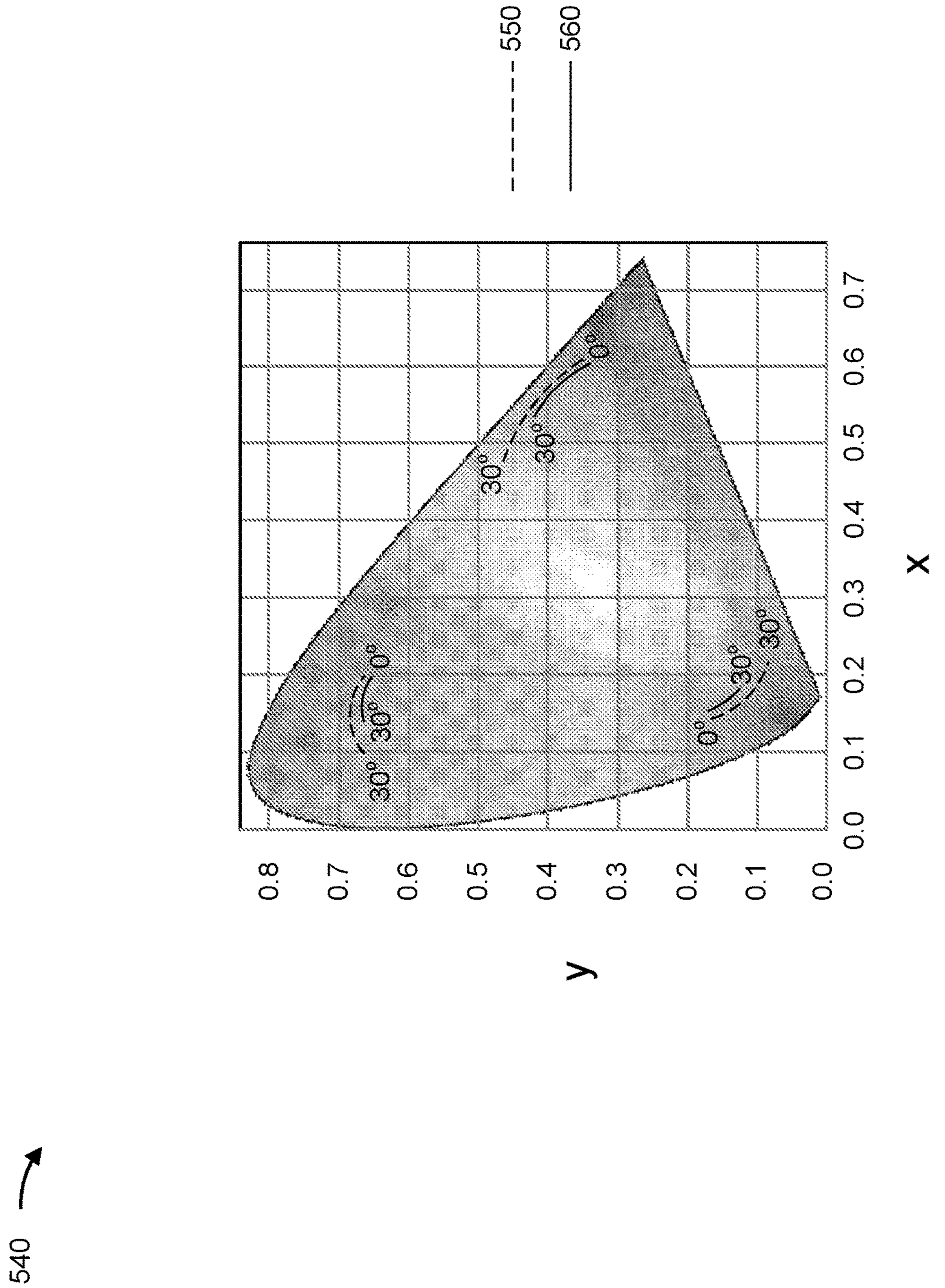

FIGS. 5A-5C are diagrams of example angle shift characteristics of the optical filter 106 (e.g., when the optical filter 106 is a dye-based RGB optical filter) and the multi-bandpass optical interference filter 110 described herein (e.g., when the multi-bandpass optical interference filter 110 is an RGB triple-bandpass optical filter).

FIG. 5A is a diagram of an example plot 500 that shows a transmittance performance 510 (e.g., a red light transmittance performance 510-1, a green light transmittance performance 510-2, and a blue light transmittance performance 510-3) of the optical filter 106 at different AOIs. As shown in FIG. 5A, the transmittance performance 510 of the optical filter 106 shifts between 20-30 nm from a 0 degree AOI to a 30 degree AOI.

FIG. 5B is a diagram of an example plot 520 that shows a transmittance performance 530 (e.g., a red light transmittance performance 530-1, a green light transmittance performance 530-2, and a blue light transmittance performance 530-3) of the multi-bandpass optical interference filter 110 at different AOIs. As shown in FIG. 5B, the transmittance performance 530 of the multi-bandpass optical interference filter 110 shifts between 8-15 nm from a 0 degree AOI to a 30 degree AOI.

FIG. 5C is a diagram of an example CIE chromaticity plot 540 indicating color trajectories 550 and 560 of the optical filter 106 and the multi-bandpass optical interference filter 110, respectively, at AOIs between 0 and 30 degrees. As shown in FIG. 5C, the angle shift associated with the multi-bandpass optical interference filter 110 is smaller than the angle shift associated with the optical filter 106 (e.g., a length of a color trajectory 560 of the multi-bandpass optical interference filter 110 is less than a length of a corresponding color trajectory 550 of the optical filter 106).

As indicated above, FIGS. 5A-5C are provided as an example. Other examples may differ from what is described with regard to FIGS. 5A-5C.

Figures 6A, 6B, 6C:
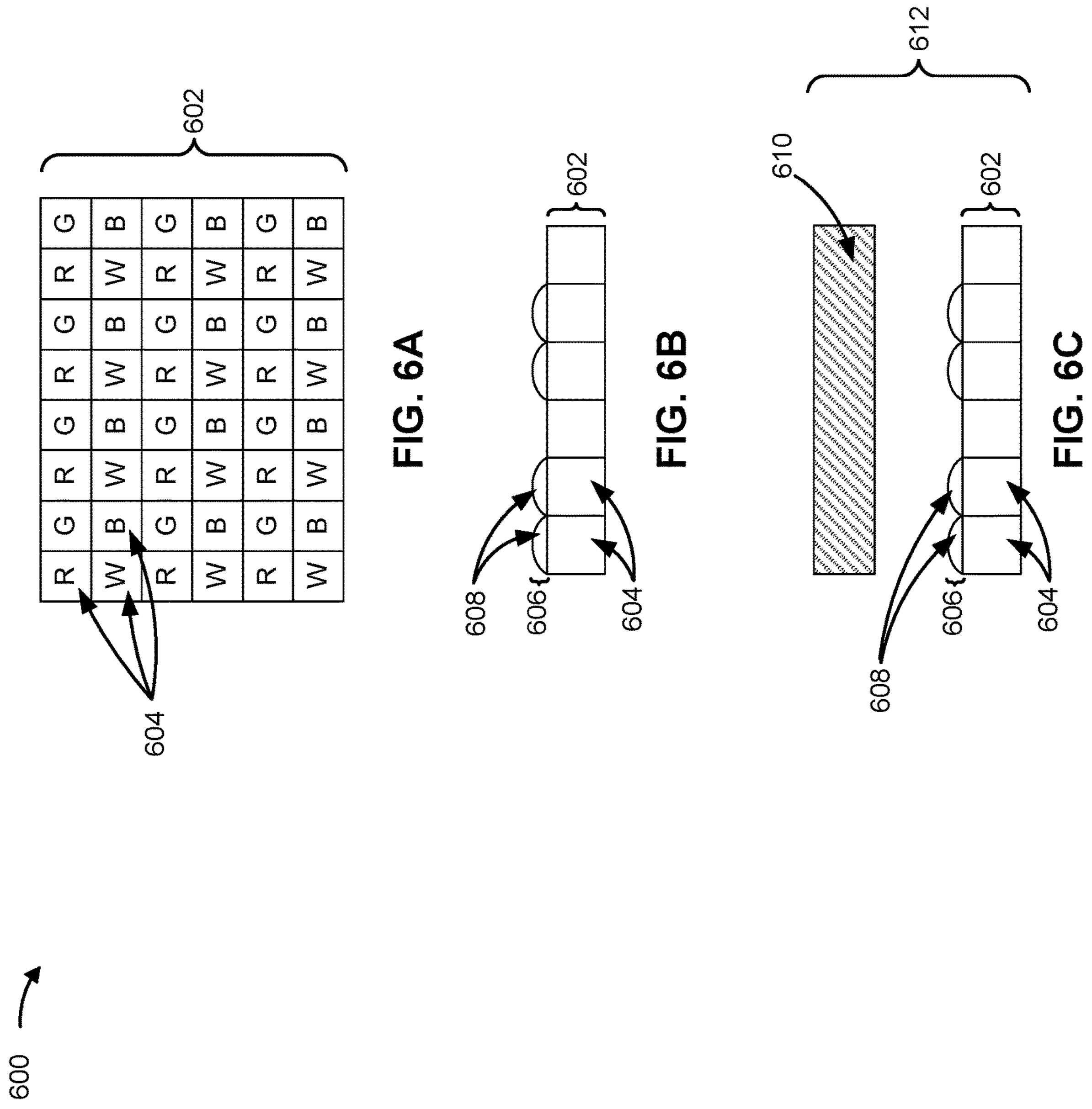
FIGS. 6A-6C are diagrams of an example implementation described herein.

FIGS. 6A-6C are diagrams of an example implementation 600 described herein. FIG. 6A shows a top-down view of an optical sensor 602 that includes a plurality of sensor elements 604 (e.g., that are the same as, or similar to, the optical sensor 102 and the plurality of sensor elements 104 described herein). As shown in FIG. 6A, the plurality of sensor elements 604 may be arranged in a particular pattern, such as an RGB+white Bayer pattern (e.g., where sensor elements 604 with an "R" label are configured to provide an indication of red light, sensor elements 604 with a "G" label are configured to provide an indication of green light, sensor elements 604 with a "B" label are configured to provide an indication of blue light, and sensor elements 604 with a "W" label are configured to provide an indication of white light, which is also referred to as "unfiltered" light).

FIG. 6B shows a side view of the optical sensor 602 and an optical filter 606 disposed on a surface of the optical sensor 602 (e.g., an input surface of the optical sensor 602) that includes one or more optical filter elements 608. The optical filter 606 and the one or more optical filter elements 608 may the same as, or similar to, the optical filter 106 and the one or more optical filter elements 108 described herein.

As shown in FIG. 6B, each optical filter element 608 may correspond to a sensor element 604 and may be disposed on a surface of the corresponding sensor element 604 (e.g., an input surface of the corresponding sensor element 604). With respect to the arrangement of the plurality of sensor elements 604, as shown in FIG. 6A, optical filter elements 608 that are configured to pass red light may be respectively disposed on the sensor elements 604 that are configured to provide an indication of red light (e.g., with an "R" label), optical filter elements 608 that are configured to pass green light may be respectively disposed on the sensor elements 604 that are configured to provide an indication of green light (e.g., with a "G" label), and optical filter elements 608 that are configured to pass blue light may be respectively disposed on the sensor elements 604 that are configured to provide an indication of blue light (e.g., with a "B" label). As further shown in FIG. 6B, no optical filter element 608 may be disposed on particular sensor elements 604, such as sensor elements 604 that are configured to provide an indication of white light (e.g., with a "W" label). In this way, these sensor elements 604 may be configured to provide an indication of unfiltered light that impinges on the sensor elements 604.

FIG. 6C shows a side view of the optical sensor 602, the optical filter 606, and a multi-bandpass optical interference filter 610 (e.g., that is the same as, or similar to, the multi-bandpass optical interference filter 110 described herein). In some implementations, the optical sensor 602, the optical filter 606, and a multi-bandpass optical interference filter 610 may be included in an optical device 612 (e.g., that is the same as, or similar to, the optical device 112 described herein).

As shown in FIG. 6C, the multi-bandpass optical interference filter 610 may be disposed over the optical filter 606 (e.g., directly on the input surface of the optical filter 606, or separated by a gap). The multi-bandpass optical interference filter 610 may be configured to pass, block, and/or reflect light associated with a plurality of spectral ranges that enter the multi-bandpass optical interference filter 610 (e.g., in a same, or similar, manner as described elsewhere herein). In some implementations, the multi-bandpass optical interference filter 610 may be, for example, a double-bandpass filter, a triple-bandpass filter, a quadruple-bandpass filter, a quintuple-bandpass filter, a sextuple-bandpass filter, or a septuple-bandpass filter. In some implementations, the multi-bandpass optical interference filter 110 may be configured to pass a plurality of non-overlapping spectral ranges of light and/or to prevent passage (e.g., by blocking or absorbing) of at least one other spectral range of light (e.g., in a same, or similar, manner as the multi-bandpass optical interference filter 110 described herein).

In some implementations, the optical sensor 602 may be configured to collect information obtained by the plurality of sensor elements 604 to generate sensor data regarding light that passes through the multi-bandpass optical interference filter 610 and the optical filter 606 to the optical sensor 602. For example, the multi-bandpass optical interference filter 610, the optical filter 606, and the optical sensor 602 may be included in the optical device 612, which may be associated with a sensing device, such as an imaging device (e.g., a visual and/or MR illuminated imaging device), a structured light device, a ToF device, an ALS device, and/or a spectrometer device, among other examples. Accordingly, the optical sensor 602 may generate sensor data related to a subject (e.g., an image of, a distance to, a depth of, an amount or types of light associated with, or other spectral information related to, the subject).

As indicated above, FIGS. 6A-6C are provided as an example. Other examples may differ from what is described with regard to FIGS. 6A-6C.

Figure 7:
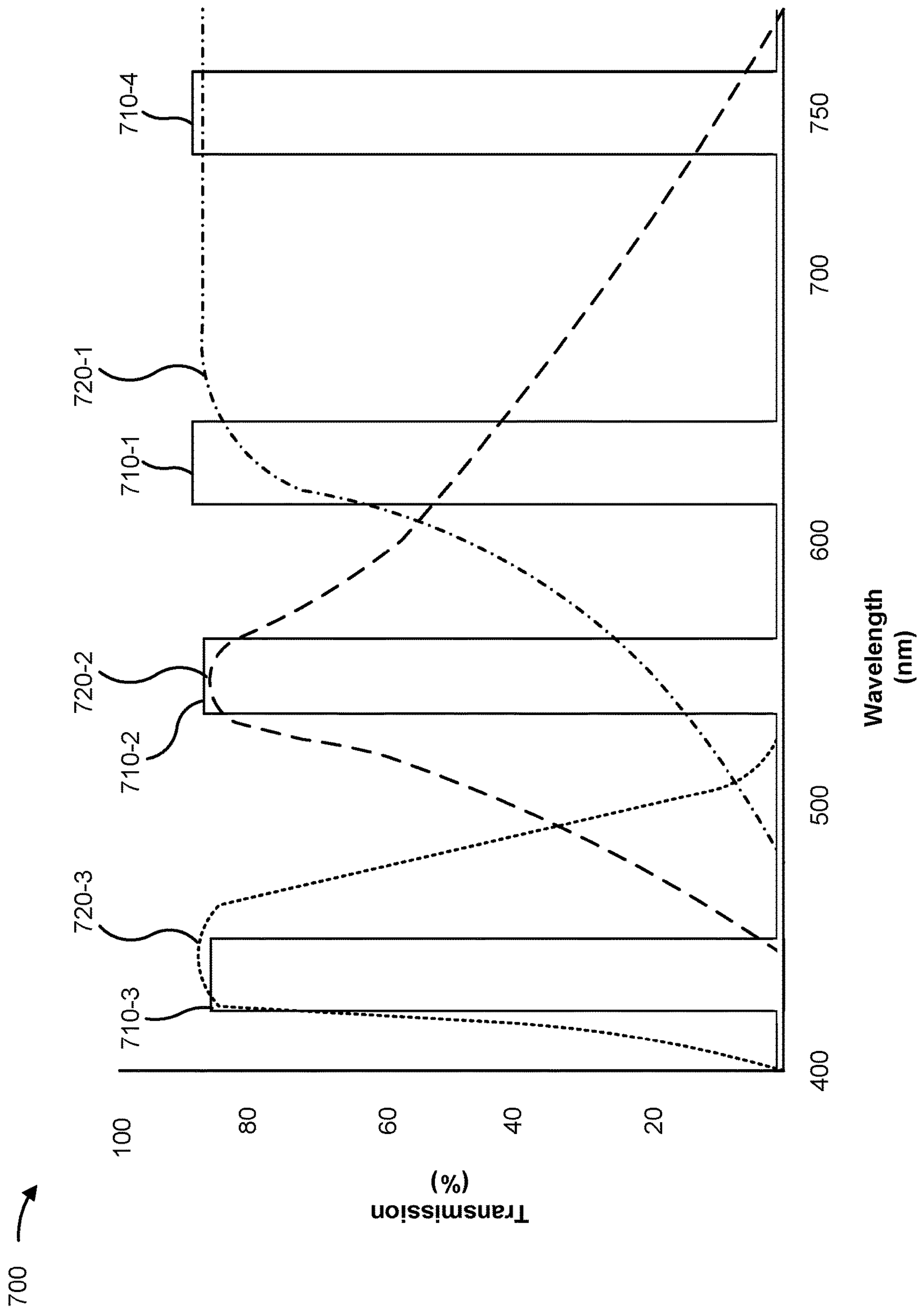
FIG. 7 is a diagram of an example plot that shows a transmittance performance of a multi-bandpass optical interference filter described herein.

FIG. 7 is a diagram of an example plot 700 that shows a transmittance performance 710 (e.g., a red light transmittance performance 710-1, a green light transmittance performance 710-2, a blue light transmittance performance 710-3, and an IR light performance 710-4) of the multi-bandpass optical interference filter 610, such as when the multi-bandpass optical interference filter 610 is an RGB+IR quadruple bandpass optical filter, overlaid on a transmittance performance 720 (e.g., a red light transmittance performance 720-1, a green light transmittance performance 720-2, and a blue light transmittance performance 720-3) of the optical filter 606. As shown in FIG. 7, the multi-bandpass optical interference filter 610 may transmit greater than a threshold amount (e.g., that is greater than or equal to 85%) of each of red light (e.g., centered at about 635 nm), green light (e.g., centered at about 560 nm), blue light (e.g., centered at about 430 nm), and IR light (e.g., centered at about 745 nm). As further shown in FIG. 7, the individual bandpass ranges (e.g., for red light, green light, blue light, and IR light) of the multi-bandpass optical interference filter 610 may be narrower than those of the optical filter 606, which allows the multi-bandpass optical interference filter 110 to provide higher color passing accuracy than the optical filter 606.

As indicated above, FIG. 7 is provided as an example. Other examples may differ from what is described with regard to FIG. 7.

Figures 8A, 8B, 8C:
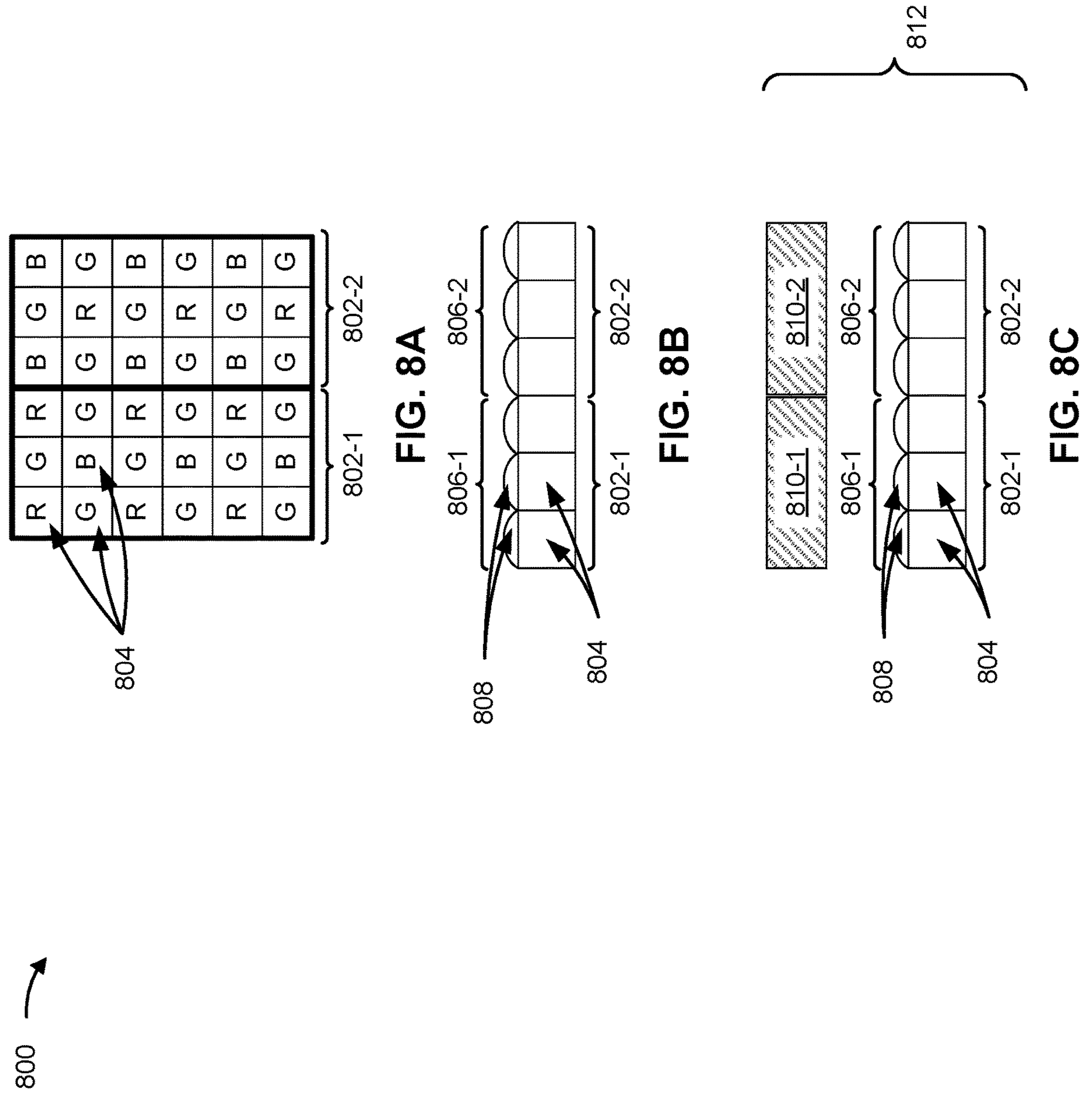
FIGS. 8A-8C are diagrams of an example implementation described herein.

FIGS. 8A-8C are diagrams of an example implementation 800 described herein. FIG. 8A shows a top-down view of an optical sensor 802 (e.g., that includes a first optical sensor region 802-1 and a second optical sensor region 802-2) that includes the plurality of sensor elements 804 (e.g., that are the same as, or similar to, the optical sensor 102 and the plurality of sensor elements 104 described herein). As shown in FIG. 8A, a first portion of the plurality of sensor elements 804 may be arranged in a first particular pattern on the first optical sensor region 802-1, such as a first RGB Bayer pattern, and a second portion of the plurality of sensor elements 804 may be arranged in a second particular pattern on the second optical sensor portion 802-2, such as a second RGB Bayer pattern. In some implementations, the first particular pattern may be an RGB pattern and the second particular pattern may be a CMY pattern, or vice versa.

FIG. 8B shows a side view of the optical sensor 802, a first optical filter 806-1 disposed on a surface of the optical sensor 802 (e.g., an input surface of the first optical sensor region 802-1) and a second optical filter 806-2 disposed on a surface of the optical sensor 802 (e.g., an input surface of the second optical sensor region 802-2). Each optical filter 806 includes one or more optical filter elements 808. The optical filters 806 and the one or more optical filter elements 808 may the same as, or similar to, the optical filter 106 and the one or more optical filter elements 108 described herein.

As shown in FIG. 8B, each optical filter element 808 may correspond to a sensor element 804 and may be disposed on a surface of the corresponding sensor element 804 (e.g., an input surface of the corresponding sensor element 804). With respect to the arrangement of the plurality of sensor elements 804, as shown in FIG. 8A, optical filter elements 808 of the first optical filter 806-1 that are configured to pass red light may be respectively disposed on the sensor elements 804 of the first optical sensor region 802-1 that are configured to provide an indication of red light (e.g., with an “R” label), optical filter elements 808 of the first optical filter 806-1 that are configured to pass green light may be respectively disposed on the sensor elements 804 of the first optical sensor region 802-1 that are configured to provide an indication of green light (e.g., with a “G” label), and optical filter elements 808 of the first optical filter 806-1 that are configured to pass blue light may be respectively disposed on the sensor elements 804 of the first optical sensor region 802-1 that are configured to provide an indication of blue light (e.g., with a “B” label). Further, optical filter elements 808 of the second optical filter 806-2 that are configured to pass red light may be respectively disposed on the sensor elements 804 of the second optical sensor region 802-2 that are configured to provide an indication of red light (e.g., with an “R” label), optical filter elements 808 of the second optical filter 806-2 that are configured to pass green light may be respectively disposed on the sensor elements 804 of the second optical sensor region 802-2 that are configured to provide an indication of green light (e.g., with a “G” label), and optical filter elements 808 of the second optical filter 806-2 that are configured to pass blue light may be respectively disposed on the sensor elements 804 of the second optical sensor region 802-2 that are configured to provide an indication of blue light (e.g., with a “B” label). In some implementations, the first optical filter 806-1 may be configured to pass RBG light and the second optical filter 806-2 may be configured to pass CMY light, or vice versa.

FIG. 8C shows a side view of the optical sensor 802, the first optical filter 806-1, the second optical filter 806-2, a first multi-bandpass optical interference filter 810-1, and a second multi-bandpass optical interference filter 810-2 (e.g., that are each the same as, or similar to, the multi-bandpass optical interference filter 110 described herein). In some implementations, the first optical filter 806-1, the second optical filter 806-2, the first multi-bandpass optical interference filter 810-1, and the second multi-bandpass optical interference filter 810-2 may be included in an optical device 812 (e.g., that is the same as, or similar to, the optical device 112 described herein).

As shown in FIG. 8C, the first multi-bandpass optical interference filter 810-1 and the second multi-bandpass optical interference filter 810-2 may be respectively disposed over the first optical filter 806-1 and the second optical filter 806-2 (e.g., directly on the respective input surfaces of the first optical filter 806-1 and the second optical filter 806-2, or separated by a gap). Each multi-bandpass optical interference filter 810 of the first multi-bandpass optical interference filter 810-1 and the second multi-bandpass optical interference filter 810-2 may be configured to pass, block, and/or reflect light associated with a plurality of spectral ranges that enter the multi-bandpass optical interference filter 810 (e.g., in a same, or similar, manner as described elsewhere herein). In some implementations, each multi-bandpass optical interference filter 810 may be, for example, a double-bandpass filter, a triple-bandpass filter, a quadruple-bandpass filter, a quintuple-bandpass filter, a sextuple-bandpass filter, or a septuple-bandpass filter. In some implementations, each multi-bandpass optical interference filter 810 may be configured to pass a plurality of non-overlapping spectral ranges of light and/or to prevent passage (e.g., by blocking or absorbing) at least one other spectral range of light (e.g., in a same, or similar, manner as the multi-bandpass optical interference filter 110 described herein). For example, the first multi-bandpass optical interference filter 810-1 may be configured to pass at least three non-overlapping spectral ranges of light (e.g., visible light) and the second multi-bandpass optical interference filter 810-2 may be configured to pass another at least three non-overlapping spectral ranges of light (e.g., visible light). At least one of the at least three non-overlapping spectral ranges of light may overlap with at least one of the other three non-overlapping spectral ranges of light. In some implementations, the first multi-bandpass optical interference filter 810-1 may be configured to pass RBG light and the second multi-bandpass optical interference filter 810-2 may be configured to pass CMY light, or vice versa.

In some implementations, the optical sensor 802 may be configured to collect information obtained by the plurality of sensor elements 804 to generate sensor data regarding light that passes through the first multi-bandpass optical interference filter 810-1 and the first optical filter 806-1, and/or the second multi-bandpass optical interference filter 810-2 and the second optical filter 806-2, to the optical sensor 802. For example, the first multi-bandpass optical interference filter 810-1, the second multi-bandpass optical interference filter 810-2, the first optical filter 806-1, the second optical filter 806-2, and the optical sensor 802 may be included in the optical device 812, which may be associated with a sensing device, such as an imaging device (e.g., a visual and/or MR illuminated imaging device), a structured light device, a ToF device, an ALS device, and/or a spectrometer device, among other examples. Accordingly, the optical sensor 802 may generate sensor data related to a subject (e.g., an image of, a distance to, a depth of, an amount or types of light associated with, or other spectral information related to, the subject).

As indicated above, FIGS. 8A-8C are provided as an example. Other examples may differ from what is described with regard to FIGS. 8A-8C.

Figure 9:
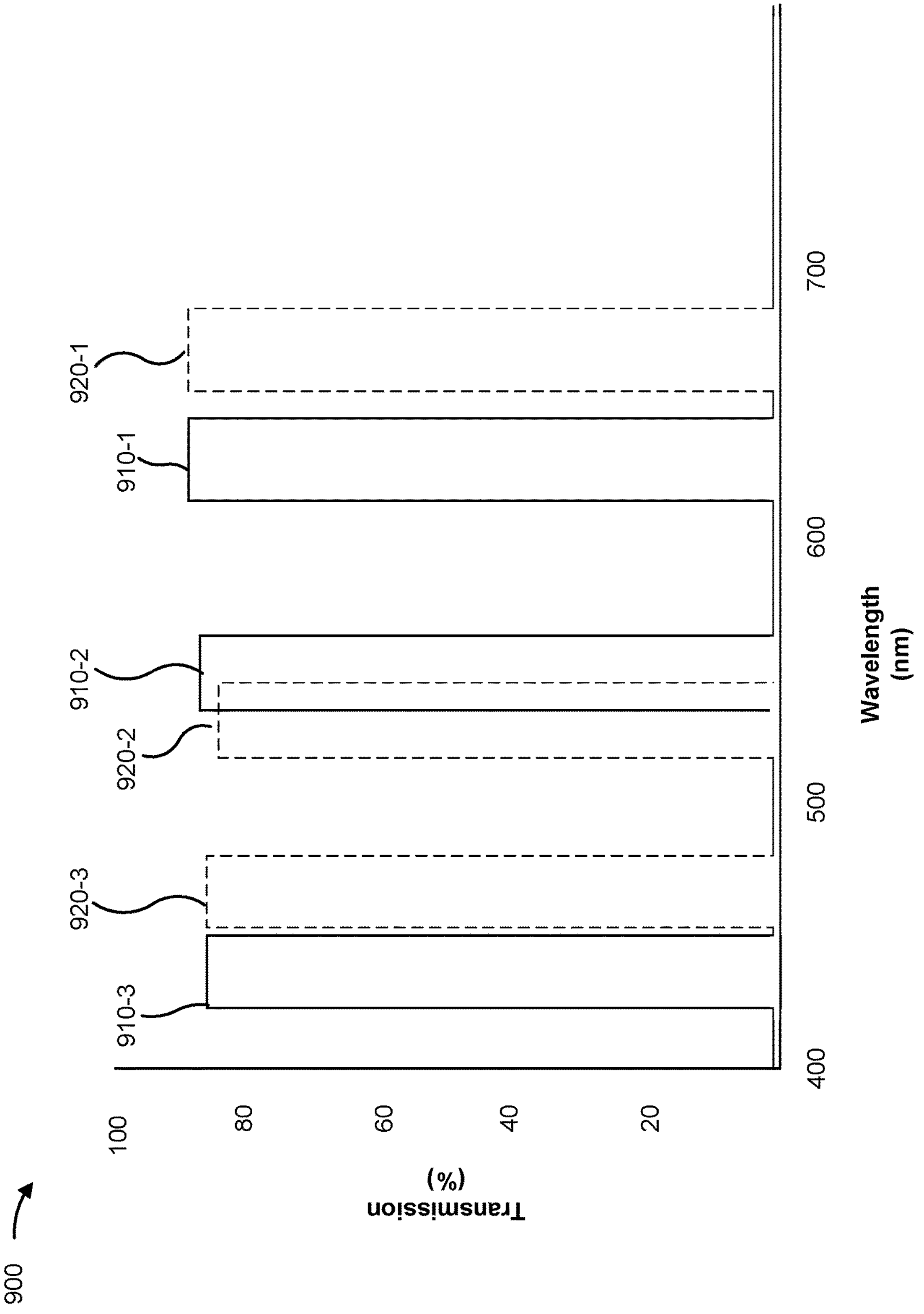
FIG. 9 is a diagram of an example plot that shows a transmittance performance of a multi-bandpass optical interference filter described herein.

FIG. 9 is a diagram of an example plot 900 that shows a transmittance performance 910 (e.g., a red light transmittance performance 910-1, a green light transmittance performance 910-2, and a blue light transmittance performance 910-3) of the first multi-bandpass optical interference filter 810-1, such as when the multi-bandpass optical interference filter 810-1 is a first RGB triple-bandpass optical filter, and a transmittance performance 920 (e.g., a red light transmittance performance 920-1, a green light transmittance performance 920-2, and a blue light transmittance performance 920-3) of the second multi-bandpass optical interference filter 810-2, such as when the multi-bandpass optical interference filter 810-2 is a second RGB triple-bandpass optical filter. As shown in FIG. 9, the first multi-bandpass optical interference filter 810-1 and the second multi-bandpass optical interference filter 810-2 may transmit respective portions of red light, green light, and blue light. For example, the first multi-bandpass optical interference filter 810-1 may pass red light centered at about 635 nm, green light centered at about 560 nm, and blue light centered at about 430 nm. The second multi-bandpass optical interference filter 810-2 may pass red light centered at about 685 nm, green light centered at about 545 nm, and blue light centered at about 460 nm. In this way, the first multi-bandpass optical interference filter 810-1 and the second multi-bandpass optical interference filter 810-2 may enable an increased color resolution (e.g., by providing six color channels, as compared to three color channels of a single RGB optical filter) of the optical sensor 802.

As indicated above, FIG. 9 is provided as an example. Other examples may differ from what is described with regard to FIG. 9.

While some implementations described herein are directed to optical sensors sensing RGB light and optical filters and multi-bandpass optical interference filters passing RGB light, some implementations include optical sensors sensing, and optical filters and multi-bandpass optical interference filters passing, other light, such as CMY light.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:

an optical sensor;

a dye-based optical filter including optical filter elements that are disposed directly on one or more first sensor elements of the optical sensor, wherein no optical filter elements are disposed directly on one or more second sensor elements of the optical sensor; and a multi-bandpass optical interference filter disposed over the dye-based optical filter, disposed over the one or more first sensor elements and the one or more second sensor elements, and configured to:
pass a first spectral range of visible light;
pass a second spectral range of visible light,
wherein the second spectral range does not overlap with the first spectral range;
pass a third spectral range of visible light,
wherein the third spectral range does not overlap with the first spectral range and does not overlap with the second spectral range; and
prevent passage of a fourth spectral range of near-infrared light.

2. The optical device of claim 1, wherein:
the first spectral range is between 620 and 750 nanometers;
the second spectral range is between 500 and 570 nanometers; the third spectral range is between 450 and 499 nanometers; and the fourth spectral range is between 751 and 1100 nanometers.

3. The optical device of claim 1, wherein respective angle shifts associated with the first spectral range, the second spectral range, and the third spectral range are less than or equal to a threshold shift amount for angles of incidence between 0 and 30 degrees.

4. The optical device of claim 3, wherein the threshold shift amount is less than or equal to 15 nanometers.

5. The optical device of claim 1, wherein an angle shift associated with each spectral range, of the first spectral range, the second spectral range, and the third spectral range, is less than or equal to 2.0% of a center wavelength of the spectral range for angles of incidence between 0 and 30 degrees.

6. The optical device of claim 1, wherein the multi-bandpass optical interference filter comprises a set of layers disposed on a surface of a substrate, wherein:
a first subset of layers, of the set of layers, includes a first material;
a second subset of layers, of the set of layers, includes a second material that is different than the first material; and
the first subset of layers and the second subset of layers are disposed on the substrate in an alternating layer order.

7. The optical device of claim 6, wherein:
the first subset of layers have a first refractive index with a first value;
the second subset of layers have a second refractive index with a second value that is greater than the first value; and
the multi-bandpass optical interference filter has an effective refractive index greater than or equal to 95% of the second value.

8. The optical device of claim 1, wherein the dye-based optical filter is configured to:
pass a fifth spectral range of visible light, a sixth spectral range of visible light, and a seventh spectral range of visible light and near-infrared light, wherein:
the first spectral range overlaps with the fifth spectral range; the second spectral range overlaps with the sixth spectral range;
the third spectral range overlaps with the seventh spectral range; and the fourth spectral range overlaps with the seventh spectral range.

9. The optical device of claim 1,
wherein the multi-bandpass optical interference filter includes a substrate,
wherein the substrate is disposed on a first side of the dye-based optical filter, and
wherein a second side of the dye-based optical filter is disposed directly on the one or more first sensor elements of the optical sensor.

10. An optical device, comprising:
a dye-based optical filter configured to be disposed directly on one or more first portions of an optical sensor without being disposed directly on one or more second portions of the optical sensor; and
a multi-bandpass optical interference filter disposed over the one or more first portions of the optical sensor and the one or more second portions of the optical sensor, wherein the multi-bandpass optical interference filter is configured to:
pass at least three non-overlapping spectral ranges of visible light,
wherein an angle shift associated with each spectral range, of the at least three non-overlapping spectral ranges, is less than or equal to 2.0% of a center wavelength of the spectral range for angles of incidence between 0 and 30 degrees.

11. The optical device of claim 10, wherein the multi-bandpass optical interference filter prevents passage of another spectral range of near-infrared light.

12. The optical device of claim 10, further comprising the optical sensor,
wherein the multi-bandpass optical interference filter is disposed over the dye-based optical filter.

13. The optical device of claim 12, wherein an effective refractive index of the dye-based optical filter is greater than or equal to 1.65 and an effective refractive index of the multi-bandpass optical interference filter is greater than or equal to 2.65.

14. The optical device of claim 10, further comprising:
another multi-bandpass optical interference filter configured to pass another at least three non-overlapping spectral ranges of visible light, wherein:
the dye-based optical filter is a first dye-based optical filter disposed directly on a first region of the optical sensor,
a second dye-based optical filter disposed directly on a second region of the optical sensor,
the multi-bandpass optical interference filter is disposed over the first dye-based optical filter, and
the other multi-bandpass optical interference filter is disposed over the second dye-based optical filter.

15. The optical device of claim 10, wherein the multi-bandpass optical interference filter comprises a set of layers, wherein:
a first subset of layers, of the set of layers, includes a first material;
a second subset of layers, of the set of layers, includes a second material that is different than the first material; and
the first subset of layers and the second subset of layers are arranged in an alternating layer order.

16. A device, comprising:
a dye-based optical filter including optical filter elements that are configured to be disposed directly on one or more first sensor elements of an optical sensor without being disposed directly on one or more second sensor elements of the optical sensor; and a multi-bandpass optical interference filter disposed over the one or more first sensor elements and the one or more second sensor elements, wherein the multi-bandpass optical interference filter comprises:

a set of layers disposed on a substrate, wherein:

a first subset of layers, of the set of layers, includes a first material;

a second subset of layers, of the set of layers, includes a second material that is different than the first material;

the first subset of layers and the second subset of layers are disposed on the substrate in an alternating layer order; and the multi-bandpass optical interference filter is configured to pass at least three non-overlapping spectral ranges of light, wherein an angle shift associated with each spectral range, of the at least three non-overlapping spectral ranges, is less than or equal to 2.0% of a center wavelength of the spectral range for angles of incidence between 0 and 30 degrees.

17. The device of claim 16, wherein the multi-bandpass optical interference filter prevents passage of another spectral range of light.

18. The device of claim 16, wherein:

the first subset of layers have a first refractive index with a first value;

the second subset of layers have a second refractive index with a second value that is greater than the first value; and the multi-bandpass optical interference filter has an effective refractive index greater than or equal to 95% of the second value.

19. The device of claim 16, wherein the set of layers are disposed on a single surface of the substrate.

20. The device of claim 16, wherein one or more spectral ranges of the at least three non-overlapping spectral ranges of light are spectral ranges of visible light.

* * * * *